United States Patent [19]
Beanland

[11] Patent Number: 6,028,847
[45] Date of Patent: Feb. 22, 2000

[54] MULTIPLE STREAM TRAFFIC EMULATOR

[75] Inventor: Matthew G. Beanland, Ringwood, Australia

[73] Assignee: Hewlett-Packard Company, Palo Alto, Calif.

[21] Appl. No.: 08/904,188

[22] Filed: Jul. 31, 1997

[51] Int. Cl.[7] .................................................. G06F 9/455
[52] U.S. Cl. ............................................ 370/252; 370/412
[58] Field of Search .................................... 370/241, 242,
370/243, 244, 245, 250, 252, 253, 412,
537; 395/500.44; 375/527; 702/182, 183,
185

[56] References Cited

U.S. PATENT DOCUMENTS

| | | | |
|---|---|---|---|
| 5,440,719 | 8/1995 | Hanes et al. | 395/500.42 |
| 5,526,283 | 6/1996 | Hershey et al. | 370/252 |
| 5,586,266 | 12/1996 | Hershey et al. | 370/252 |
| 5,615,135 | 3/1997 | Waclawsky et al. | 702/183 |

*Primary Examiner*—Ricky Ngo

[57] ABSTRACT

The multiple stream traffic emulator functions to generate multiple stream packet based traffic pursuant to a selected statistical model. The generation of the traffic is controlled by an element that generates data indicative of a pattern of data traffic for each of a plurality of input data streams. This element can either produce this data in real time or this data can be resident in memory. In the real time application, a processor, such as a digital signal processor (DSP), can be used to generate the data. In the pregenerated data instance, the data is typically produced by an external processing element and stored in a memory, where either the user can select from among various types of data stored in the memory, or the data for use in a single traffic emulation instance is stored in the memory. In one implementation of the system, an interdeparture queue is used to store data representative of a selected statistical traffic model, comprising both a pattern of data traffic and a traffic load. A departure scheduler reads this stored data out of the list maintained by the interdeparture queue to identify the temporal relationships of data outputs among the plurality of input data streams. The departure scheduler identifies the desired time of departure of each data packet as well as the selected stream from which the data packet originates. The departure scheduler drives a cell generator which produces the resultant output data stream for transmission to the equipment under test. The cell generator produces standard data packets for each of the output data streams and releases the generated packets into these streams at a time designated by the departure scheduler.

20 Claims, 3 Drawing Sheets

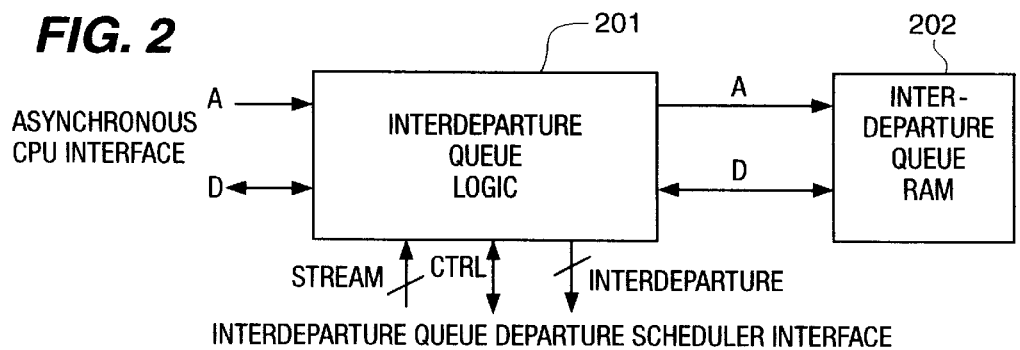
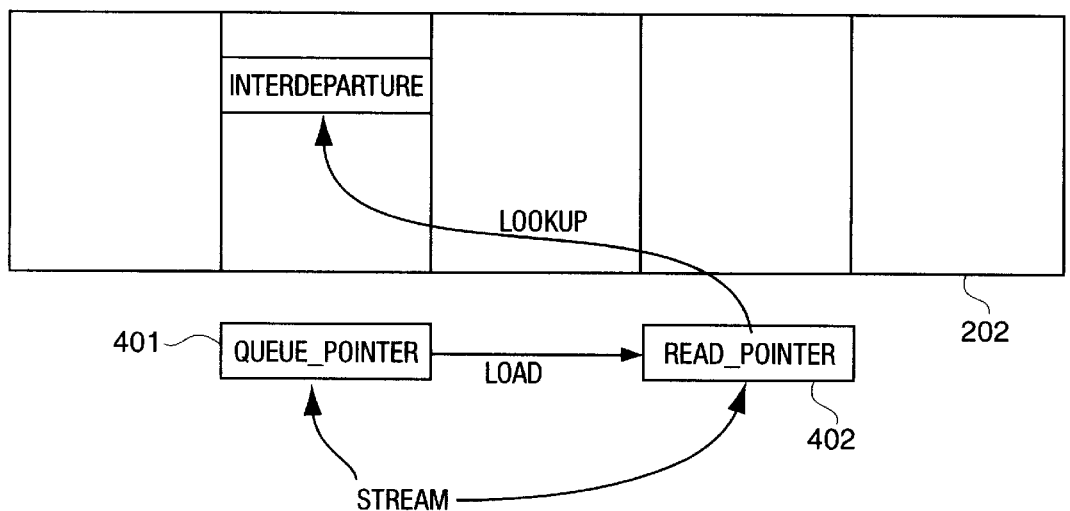
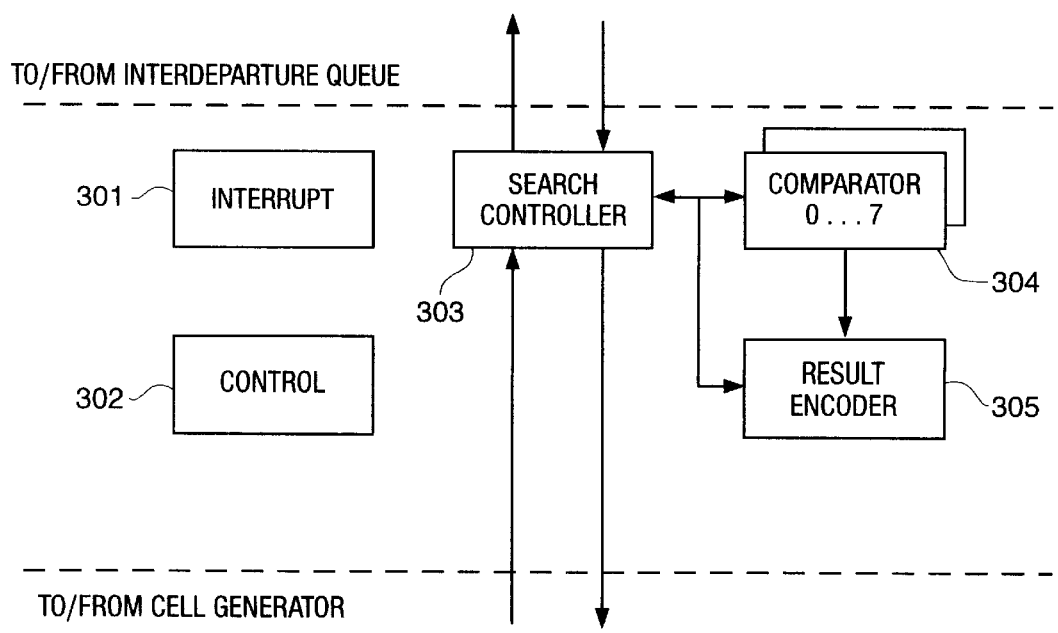

MULTIPLE STREAM TRAFFIC EMULATOR

FIELD OF THE INVENTION

This invention relates to test equipment and, in particular, to a multiple stream traffic emulator which functions to generate digital traffic for equipment to be tested. The system, in one implementation, uses a list that contains data which represents any of a plurality of various traffic models, which list is used to control the generation of data packets for multiple streams of data and the multiplexing of these multiple streams of data into an output transmission.

BACKGROUND

In the field of test equipment, it is a problem to efficiently generate an output data stream that emulates the diverse statistical patterns of real world data transmissions. This is especially pertinent in the field of data communications for remotely located devices wherein the equipment must be operational under adverse conditions, and responsive to various patterns of input data traffic. In order to exhaustively test such equipment, diverse patterns of data traffic as well as varying traffic loads must be simulated to ensure that the equipment is operational under the conditions that exist in their installed environment.

The present state of the industry is that a large segment of the equipment manufacturers do not believe that the emulation of various patterns of real world data transmissions is either practical or effective to test their equipment. This segment of the industry typically field tests their equipment in real-world situations to thereby ascertain whether the equipment is properly functioning. A significant limitation of this approach is that unusual patterns of traffic are typically not encountered during the test phase and the equipment is therefore not thoroughly tested. In addition, the user does not have any control over the loads presented to the equipment. Thus, this method of testing essentially defers the identification of subtle problems to the customer detection of inoperability of the equipment.

An alternative test approach is to analyze the equipment based upon a theoretical analysis of the design. This analytical approach uses standard models of traffic generated by standards or industry research bodies, such as Bellcore, to review the efficacy of the equipment design. The standard models of traffic can provide accurate traffic data, but the limitation of this approach is that the accuracy of the analysis is limited to the ability of the researcher to compute traffic loads for a small number of statistical patterns. In addition, the interaction among various loads and the use of unpredictable loads are typically not reviewed due to the overwhelming computational load presented by such an analysis.

In summary, the problem with testing data communication and data processing equipment in the field of data communications is that there is no test equipment available to generate traffic loads that can be varied by the user to test equipment under widely varying traffic conditions. This is especially pertinent in the case of equipment which is connected to a transmission medium that carries multiplexed data traffic.

SUMMARY OF THE INVENTION

The above described problems are solved and a technical advance achieved by the multiple stream traffic emulator which functions to generate a plurality of streams of packet based data traffic pursuant to a user selected traffic model. This is accomplished in one implementation of the system by the use of an interdeparture queue which functions to store data representative of at least one selected traffic model, comprising both a pattern of data traffic and a traffic load. A user selects a traffic model for each of a plurality of input streams, and multiple different traffic models can be concurrently supported by the interdeparture queue. A departure scheduler requests the next interdeparture value from the interdeparture queue and adds this value to the last scheduled departure time for each of the plurality of input data streams to schedule the next departure. The departure scheduler identifies the desired time of departure of each data packet as well as the selected stream from which the data packet originates. The departure scheduler drives a cell generator which produces the resultant output data stream for transmission to the equipment under test. The cell generator produces a data packet for an identified output data stream at the appropriate instant of time identified by the departure scheduler.

This apparatus can concurrently incorporate data which present a plurality of types of loads and which have traffic characteristics that follow different models into the generated streams of cells. In this manner, the interactions among the various data streams occasioned by the concurrent presence of varying loads and varying data traffic types can be determined. The user can create any desired traffic conditions that they desire.

In addition, the system can be implemented in a number of alternative ways to generate both deterministic and statistical data traffic patterns. The interdeparture values can be generated via the use of the above-noted list or they can be calculated in real time by the incorporation of a processing element into the traffic generator, to thereby make the packet generation a function of real-time variables that are detected by the processing element. Furthermore, the content of the generated data traffic can be dynamically varied so that this architecture can be used to produce fixed length packets or packets of varying length, with the contents of the packets being dynamically determined. Thus, this system concept has broad applicability and provides the flexibility to implement a wide variety of test environments.

BRIEF DESCRIPTION OF THE DRAWINGS

FIG. 2 illustrates additional details of the structure of the interdeparture queue;

FIG. 3 illustrates the mapping of a stream to an interdeparture value;

FIG. 4 illustrates additional details of the structure of the departure scheduler;

DETAILED DESCRIPTION OF THE PREFERRED EMBODIMENTS

Figure 1:
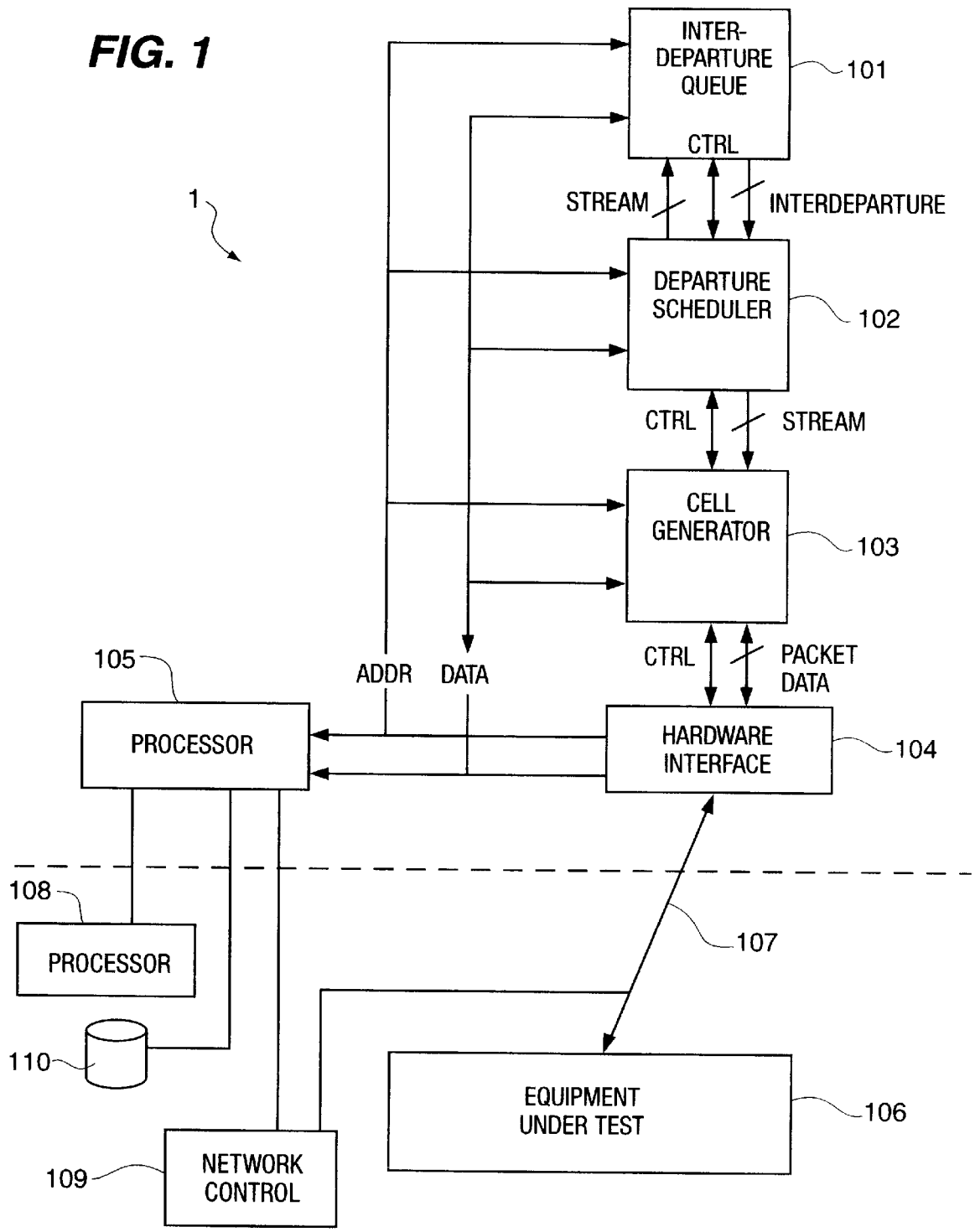
FIG. 1 illustrates in block diagram form the overall architecture of the multiple stream traffic emulator and an application environment in which it operates.

Data transmission based upon cell or packet technology is well known. In this technology, the sequence of information to be transmitted is broken into discrete segments termed cells or packets, with cells typically being fixed length and packets being variable length. The cell information is termed the payload and it contains user information bits and is given a header which includes network information bits to aid in identifying, checking and routing the cell. The cells can then be transmitted across the network independently of other cells in the information sequence. A well known implementation of such a data transmission technology is termed the Asynchronous Transfer Mode (ATM) which employs a 53 byte cell, which includes a 5 byte header and a 48 byte payload. Therefore, for this description, the implementation details of the multiple stream traffic emulator are described in terms of the ATM technology.

Architecture Considerations

The multiple stream traffic emulator functions to generate packet data representative of a typical traffic pattern for a plurality of independent input streams. The generation of the traffic is controlled by an element that generates data indicative of a pattern of data traffic for each of a plurality of input data streams. This element can either produce this traffic pattern data in real time or this traffic pattern data can be resident in memory. In the real time application, a processor, such as a digital signal processor (DSP), can be used to generate the traffic pattern data. In the pregenerated data instance, the traffic pattern data is typically produced by an external processing element and stored in a memory, where either the user can select from among various types of traffic pattern data stored in the memory, or the traffic pattern data for use in a single traffic emulation instance is stored in the memory.

The data traffic that is generated for each input stream comprises a series of cells that are generated and output pursuant to a typical traffic model. The plurality of input streams are uniform in that no input stream receives preferential processing for incorporation into the output stream. However, each input stream can carry data traffic that differs in its content, traffic load and traffic pattern from the other ones of the plurality of input streams. The class of data traffic that is generated can be constant bit rate, variable bit rate, available bit rate (where the channel provides feedback regarding the present bit rate capacity of the channel), random data, or any type of data traffic desired by the user. The characteristics of each input stream can be defined by the user, independent of the characteristics of the other input channels. Furthermore, the data carried by each input stream can be defined on a fixed or dynamic basis. Thus, the multiple stream traffic emulator enables the user to create any test configuration that is desired.

The multiple stream traffic emulator is disclosed herein as a list-based system, wherein an interdeparture queue stores the data indicative of the output cell generation schedule for each of the input streams. The interdeparture queue data is indicative of the time interval between successive output cells for each of the output streams. The interdeparture data reflects a distribution of output cells that corresponds to a selected deterministic or statistical traffic pattern. The list-based implementation of the multiple stream traffic emulator provides a clear illustration of the capabilities of the multiple stream traffic emulator system.

System Architecture of the Multiple Stream Traffic Emulator

FIG. 1 illustrates in block diagram form the multiple stream traffic emulator 1 which functions to generate multiple stream packet data traffic pursuant to selected traffic models, as well as an operating environment in which it operates. A typical operating environment comprises the equipment under test 106, such as a data terminal, connected via a data communication medium 107 to the multiple stream traffic emulator 1. The multiple stream traffic emulator 1 receives its inputs from any of a number of sources, which can be an external source, such as a terminal/processor 108, a data communication connection 109, a data storage medium 110, or an internal source, such as processor 105. The multiple stream traffic emulator 1 receives the inputs, which comprise control data that defines the statistical traffic model for each of the input streams as well as other operational/control data, and generates a multiplexed stream of output data packets which can be applied directly to an equipment under test 106 or can be transmitted via the data communication medium 107 to the equipment under test 106.

The multiple stream traffic emulator 1 conceptually consists of two segments: data generation and traffic generation. The data generation segment produces the actual data that is transmitted to the equipment under test 106. The traffic generation segment receives data transmit request messages from the interface hardware 104 that interconnects the multiple stream traffic emulator 1 to the equipment under test 106 and returns an indication to the data generation segment of whether there is data to be sent, which input data stream is to be sent, and manages contention when more than one stream is waiting to send a cell. The data generation segment translates this received information to the actual data to be sent. In the multiple stream traffic emulator 1, the data generation segment comprises the cell generator 103 and the traffic generator segment comprises the interdeparture queue 101, departure scheduler 102 and the processor 105.

The data generation is managed in the multiple stream traffic emulator 1 by the use of an interdeparture queue 101 which functions to store data representative of at least one selected traffic model, comprising both a pattern of data traffic and a traffic load. A traffic model is selected for each of a plurality of input streams, and multiple different traffic models can be concurrently supported. A departure scheduler 102 reads this stored data out of the lists maintained by the interdeparture queue 101 to identify the temporal relationships of data outputs among the plurality of input data streams. The departure scheduler 102 identifies the desired time of departure of each data packet as well as the selected stream from which the data packet originates. The departure scheduler 102 drives a cell generator 103 which produces the resultant output data stream for transmission to the equipment under test 106. The cell generator 103 produces standard data packets for each of the output data streams and releases the generated packets into these streams at a time designated by the departure scheduler 102. An equipment specific interface 104 may optionally be provided to interconnect the cell generator 103 to the equipment under test 106 or the data communication medium 107. The equipment specific interface 104 functions to provide the physical interconnection as well as the protocol conversion necessary to enable the cell generator output to be presented to the equipment under test 106.

The traffic models used in this apparatus can be standard statistical models of traffic generated by standards or industry research bodies, such as Bellcore, to review the efficacy of the equipment design, or can be any user defined model of data traffic. Included in this architecture is the ability to incorporate a processing element 105 in the multiple stream traffic emulator 1 to thereby provide real time data traffic generation based upon feedback received from, for example, the data communication medium in the case of available bit rate data transmissions (where the channel provides feedback regarding the present bit rate capacity of the channel).

Interdeparture Queue

The data that defines the characteristics of the output packets are stored in the interdeparture queue 101, which is shown in additional detail in FIG. 2. The entry of this data into the interdeparture queue 101 is accomplished by providing both data (DATA or D) and address (ADDR or A) bus extensions from the processor 105 which is the source of data to the interdeparture queue 101 to the interdeparture queue logic circuit 201. The instance of a processor provided source of data is illustrated in the preferred embodiment disclosed herein, although the above-mentioned alternative sources of data are possible.

The interdeparture queue 101 maintains a plurality (128, for example) of independent and identically featured input data streams, using the interdeparture queue memory 202 to store the queue data. Each of the plurality of input data streams has its bandwidth and distribution controlled by a concatenated queue which contains the list of interdeparture data and interdeparture control words. In particular, the input data streams are defined in terms of the time interval between the transmission of successive output packets. This simplifies the stream management task, since the data stored in the interdeparture queue memory 202 comprises an interdeparture word which defines this interdeparture time interval for each of the plurality of input data streams. Thus, the temporal pattern of output data packet transmissions for a particular input data stream, as defined by the sequence of interdeparture words, represents the selected statistical traffic pattern for the selected input data stream. Each of the plurality of input data streams may be transmitted once or continuously as defined by the control word entries written into the interdeparture queue memory 202.

Figure 6:
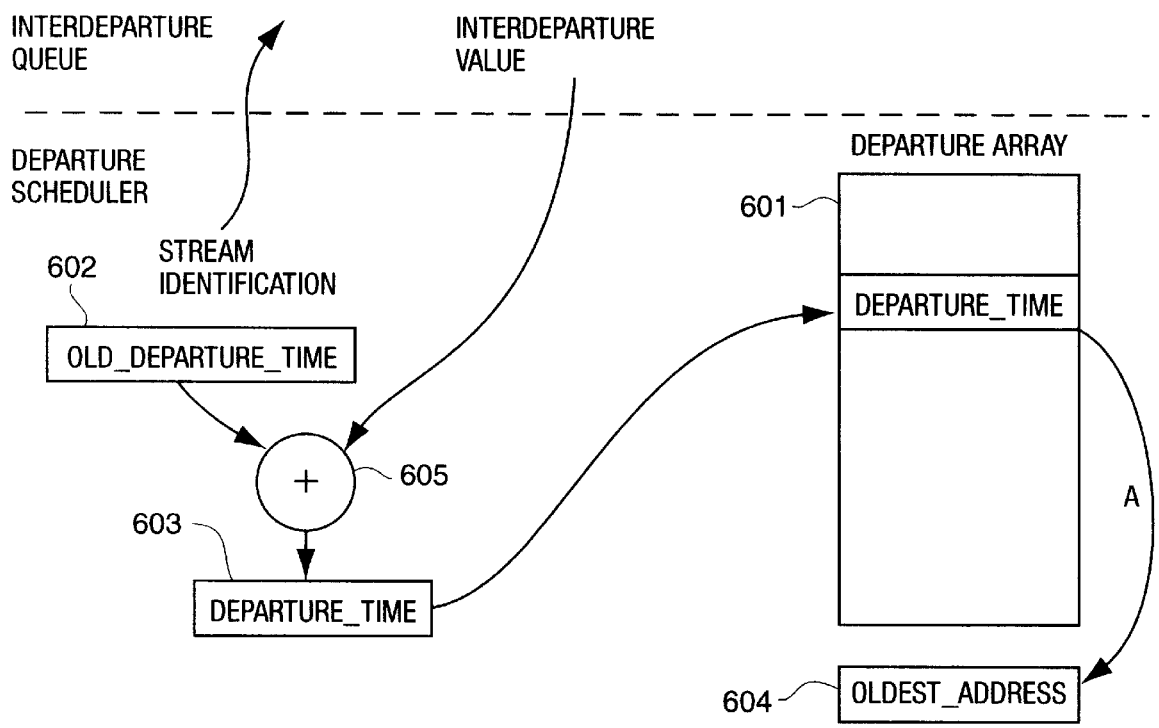
FIG. 6 illustrates the process of a departure array replacement.

As shown in FIG. 3, the interdeparture queue 101 maps each of the plurality (128) of input data streams to a corresponding queue pointer 401 which contains eight bits of queue segment address, which data is accessed on an input data stream basis. The queue pointer 401 contains the queue segment number for the corresponding input data stream. In response to an input data stream being designated as requiring an output, the interdeparture queue logic 201 loads the contents of the queue pointer 401 into the read pointer 402 for the interdeparture queue memory 202. The read pointer 402 is 17 bits long and points to any location in the 128K×32 bit word space of the interdeparture queue memory 202. The read pointer 402 is then used by the interdeparture queue logic 201 to lookup the corresponding interdeparture word that is stored in interdeparture queue memory 202 for this designated input data stream. The interdeparture word contains a 21 bit interdeparture value field which represents the number of cell slots (standard time intervals) desired between consecutively transmitted cells for this stream, 3 bits of control and 8 unused bits. The interdeparture word is used as shown in FIG. 6, with the departure scheduler 102 computing the departure time for the next output data packet for this designated input data stream. The control field is decoded in order to work out how to modify the read pointer and whether to output the interdeparture data value or to disable the data stream.

Departure Scheduler

Figure 5:
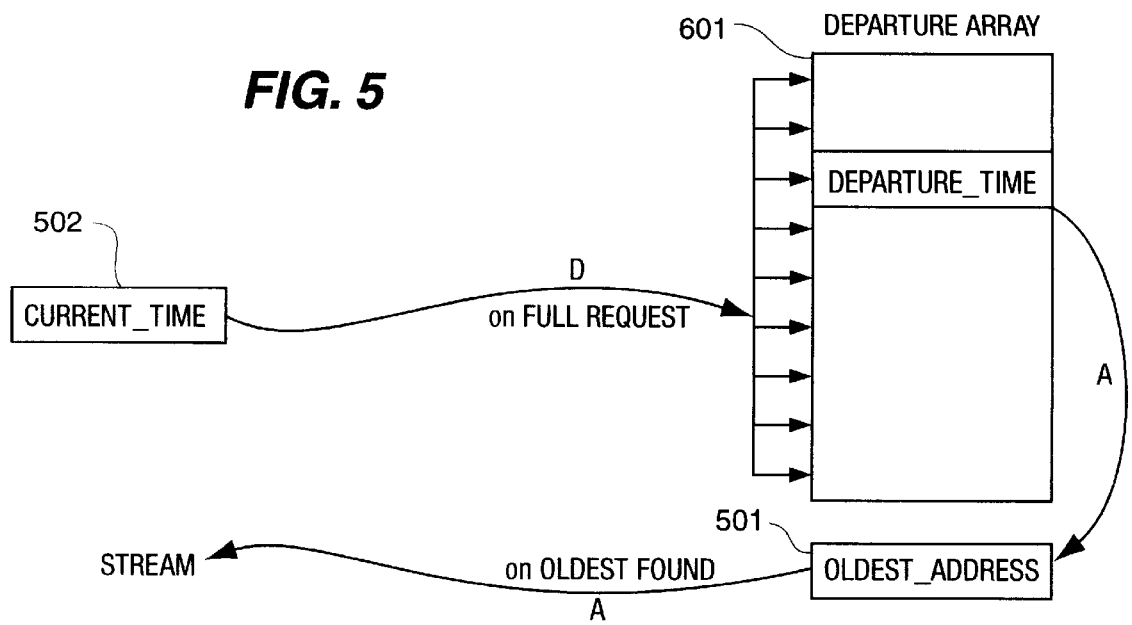
FIG. 5 illustrates the process of a departure array search attempt.

The departure scheduler 102 and its operation are shown in additional detail in FIGS. 4, 5 and 6. The departure scheduler 102 contains an array of data pointers (departure array 601), each of which represents data indicative of the next desired output data packet departure time for a corresponding one of the plurality of input data streams, as defined by the interdeparture queue 101. The departure array 601 thus contains the same number of entries as input data streams, in the present example, 128 entries.

The departure scheduler 102 receives requests to generate traffic from the hardware interface 104. The hardware interface 104 may include some cell/packet level processing in addition to providing an interface to the transmission medium 107 and/or the equipment under test 106. The hardware interface 104 typically produces a traffic request strobe on one of the control leads that connect the hardware interface 104 with the departure scheduler 102. The departure scheduler 102 responds to the received traffic request strobe with a response control signal indicative of the receipt and acceptance of this request. The departure scheduler 102, then automatically identifies the earliest scheduled departure for an output packet and returns data identifying both the input data stream designated by this identified scheduled departure as well as the departure time. This is accomplished, as shown in FIG. 6, by the search controller 303 of the departure scheduler 102 activating the comparators 304. In order to expedite the processing of the search for the next packet departure time, the comparator function is executed in parallel, by using eight comparator elements to implement comparator 304. The search controller 303 compares the data stored in current time buffer 502 with the contents of the departure array 601. The contents of the current time buffer 502 represent the output of a counter which is incremented every cell slot. Thus, the search controller 303 monitors the present time of day to identify when one of the entries written into the departure array 601 indicate that an output data packet is to be created for that input data stream at the present time. The search controller 303 looks for the oldest departure array data entry which is less than (earlier in time) than the present time. When the search controller 303 locates departures that are due, the search controller 303 outputs, in order, the address of the departure array entry to oldest address buffer 501 located in result encoder 305. The address of the memory location corresponds to the identification of the associated input data stream. Thus, the address output indicates the identity of the input data stream, whose statistical traffic distribution, as stored in interdeparture queue memory 202, requires the output of a data packet.

It is obvious that the independent nature of the plurality of input data streams can result in multiple scheduled output packet departures for any cell slot. In order to resolve any such contention, the departure scheduler 102 uses the result encoder 305 to multiplex the input data streams to ensure fair treatment of all input data streams. Thus, all pending departures for a selected time interval (present time indicative of a cell transmission slot) are processed, even if these departures must be implemented in the next successive time interval(s), before any departures scheduled for the next time interval are scheduled. Thus, a failed departure of an identified output data packet preempts future scheduled departures. The downside of this process is that it distorts the distribution of the delayed input data streams in which the preemption occurs, although the degree of distortion is minimal. The errors in the statistical model introduced by this preemption process is distributed across all of the input data streams since there is no preferential treatment among the plurality of input data streams. This error distribution thereby minimizes the impact of the errors on the input data streams and represents a typical real-world random error condition.

Once an output data packet is generated for a selected input data stream, the departure scheduler 102 rewrites the memory address location of departure array 601 that was just read out with data indicative of the next scheduled departure for the associated input data stream. This scheduling data is generated as shown in FIG. 6 by retrieving the next interdeparture word value for the selected input data stream from the interdeparture associated queue memory 202, using the associated queue pointer 401. The retrieved interdeparture word is read and the interdeparture value contained therein is loaded into the adder 605. The other input of adder 605 is the output of the old departure time buffer 602, which contains data indicative of the last computed desired time for outputting a data packet for the selected input data stream. Due to contention, as noted above, the actual transmission time of the output data packet for the selected input data stream may not correspond to the time data stored in thee old departure time buffer 602, but the stored data is used in the present computation of preserve the statistical traffic distribution defined for this input data stream. Adder 605 combines the data which identifies the last desired departure time for this identified input data stream with the retrieved interdeparture word to produce an indication of the next scheduled departure time for an output data packet for this designated input data stream. This is accomplished by adding the 21 bit interdeparture word data received from the interdeparture queue memory 202 to this input data stream's last departure time to create a new departure time value which is written into the departure array 601 in the memory location whose address corresponds to the selected input data stream identification, which data is output from oldest address buffer 604.

Thus, the departure scheduler 102 listens to traffic requests received from the hardware interface 104 and determines whether an input data stream is pending. The departure scheduler 102 then arbitrates among multiple input data streams waiting to transmit output data packets. The departure scheduler 102 then generates the output data stream.

Cell Generator

The cell generator 103 functions to receive output packet indications from the departure scheduler 102, and generate output packets which are output via a synchronous interface to the instrument specific hardware interface 104 which generates the required real-time data payload for the instrument under test 106. The cell generator 103 can be implemented by means of a memory which contains a predetermined number of previously created packets, each packet capable of being assigned once to a single input data stream. The packets in a particular input data stream are part of a linked list in that each packet includes a pointer which points to the next successive packet in the input data stream. The cells produced by the cell generator are encapsulated in a packet which is 17 long words of predetermined format. The output cells can be static in that they are read from memory and are fixed in content, or they can be dynamic in that there is real-time generation of a unique data contents for each cell.

The cells that are generated can be packetized cells which include a cell as well as associated housekeeping data. The cells can contain real time data in that a processing element contained in the multiple stream traffic emulator 1 produces cell data as a function of conditions extant at the present time. For example, a handshake protocol can be used to test the integrity of the link between the multiple stream traffic emulator 1 and the equipment under test 106. The multiple stream traffic emulator 1 can also generate a pseudo-random load and transmits this data in the cell. The equipment under test 106 also generates the same pseudo-random load and compares the received cell content with the device generated data. Any disparity between the two sets of data can be used to identify problems in the transmission medium 107 that interconnects the equipment under test 106 and the multiple stream traffic emulator 1, or the equipment under test 106 itself.

Interface to Instrument Under Test

The cell generator 103 produces packets representative of the cells generated in response to the interleaved input data streams. These packets must be propagated to the equipment under test 106 for the test to be effective. Therefore, the cell generator 103 must typically be connected to a hardware interface 104 device to interconnect the multiple stream traffic emulator 1 with the load which it drives. For example, the multiple stream traffic emulator 1 must be connected with the communication medium 107 that serves the equipment under test 106 to thereby transmit the packets generated by the cell generator 103 to the equipment under test 106 that are interconnected by the network 107. There are presently available interface elements that can perform the interconnection function. For example, there exists ATM convergence chips termed "sunny chips" which serve to receive a packet input and output the data stream on to a communication medium 107 in the proper formal and with the proper protocol. Thus, in an ATM environment, the hardware interface 104 comprises an ATM convergence chip.

Conclusion

The multiple stream traffic emulator functions to generate multiple stream packet based traffic pursuant to a selected traffic model. The resultant data is effective to test the response of the equipment under test to traffic of varying traffic characteristics as well as to test the interactions among numerous input data streams as a function of the traffic placed on the various input data streams. The user can define the test scenario with particularity and the environment so defined is emulated efficiently and precisely.

I claim:

1. A traffic emulator system for generating an output data stream comprising a plurality of input streams of packet data, each of said plurality of input streams of packet data having predefined data traffic characteristics, that are multiplexed together to form said output data stream, comprising:

traffic generator means for generating traffic data indicative of a pattern of data traffic for each of a plurality of input data streams; and data generator means, responsive to said generated traffic data, for producing a data packet for each of said input streams pursuant to said pattern of data traffic for said plurality of input data streams.

2. The traffic emulator system of claim 1 wherein said traffic generator means comprises:

storage means for storing said traffic data, indicative of said pattern of data traffic for each of said plurality of input data streams, in list-based form in a memory.

3. The traffic emulator system of claim 2 wherein said traffic generator means further comprises:

pattern generator means for generating said traffic data, indicative of said pattern of data traffic for each of said plurality of input data streams, pursuant to user provided commands.

4. The traffic emulator system of claim 2 wherein said traffic generator means further comprises:

pattern generator means for receiving said traffic data, indicative of said pattern of data traffic for each of said plurality of input data streams, from a data source external to said traffic emulator system.

5. The traffic emulator system of claim 1 wherein said traffic generator means comprises:

processor means for generating said traffic data, indicative of said pattern of data traffic for each of said plurality of input data streams, pursuant to real-time parameters measured by said traffic emulator system.

6. The traffic emulator system of claim 2 further comprising:

wherein said storage reads said traffic data, indicative of said pattern of data traffic for each of said plurality of input data streams, from said memory; and said data generator means, is responsive to said read traffic data, for computing a time at which an output data packet is to be transmitted for each of said plurality of input data streams.

7. The traffic emulator system of claim 6 wherein said data generator means comprises:

list generator means for generating a temporally ordered list of output data packets for said plurality of input data streams.

8. The traffic emulator system of claim 7 wherein said data generator means further comprises:

arbitrator means for arbitrating among at least two of said temporally ordered output data packets whose time at which a data packet is to be transmitted in said output data stream are identical to output said at least two output data packets in sequence.

9. The traffic emulator system of claim 1 wherein said data generator means comprises:

cell generator means for reading control data associated with said traffic data, indicative of said pattern of data traffic for each of said plurality of input data streams, to create an output data packet defined by said control data.

10. The traffic emulator system of claim 9 further comprising:

transmitter means for transmitting said output data packet to an equipment under test to test said equipment.

11. A method, operational in a traffic emulator system, for generating an output data stream comprising a plurality of input streams of packet data, each of said plurality of input streams of packet data having predefined data traffic characteristics, that are multiplexed together to form said output data stream, comprising the steps of:

generating data indicative of a pattern of data traffic for each of said plurality of input data streams; and producing, in response to said generated data, a data packet for each of said input data streams pursuant to said pattern of data traffic for said plurality of input data streams.

12. The method of claim 11 wherein said step of generating comprises:

storing data, indicative of said pattern of data traffic for each of said plurality of input data streams, in list-based form in a memory.

13. The method of claim 12 further comprising the step of:

generating said data, indicative of said pattern of data traffic for each of said plurality of input data streams, pursuant to user provided commands.

14. The method of claim 12 further comprising the step of:

receiving said data, indicative of said pattern of data traffic for each of said plurality of input data streams, from a data source external to said traffic emulator system.

15. The method of claim 11 further comprising the step of:

generating said data, indicative of said pattern of data traffic for each of said plurality of input data streams, pursuant to real-time parameters measured by said traffic emulator system.

16. The method of claim 12 wherein said step of generating comprises:

reading said data, indicative of said pattern of data traffic for each of said plurality of input data streams, from said memory; and computing, in response to said read data, a time at which an output data packet is to be transmitted for each of said plurality of input data streams.

17. The method of claim 16 wherein said step of generating further comprises:

generating a temporally ordered list of output data packets for said plurality of input data streams.

18. The method of claim 17 wherein said step of generating further comprises:

arbitrating among at least two of said temporally ordered output data packets whose time at which a data packet is to be transmitted in said output data stream are identical to output said at least two output data packets in sequence.

19. The method of claim 11 wherein said step of producing comprises:

reading control data associated with said data, indicative of said pattern of data traffic for each of said plurality of input data streams, to create an output data packet defined by said control data.

20. The method of claim 19 further comprising the step of:

transmitting said output data stream to an equipment under test to test said equipment.

* * * * *